United States Patent [19]

Tesch

[11] 4,328,641
[45] May 11, 1982

[54] METHOD AND RECEPTACLE FOR GROWING PLANTS

[75] Inventor: Günter Tesch, Fribourg, Switzerland

[73] Assignee: Breveteam S.A., Fribourg, Switzerland

[21] Appl. No.: 215,916

[22] Filed: Dec. 12, 1980

[30] Foreign Application Priority Data

Dec. 15, 1979 [CH] Switzerland ............... 11092/79
Sep. 24, 1980 [CH] Switzerland ............... 7148/80

[51] Int. Cl.³ ............................................. A01G 31/00
[52] U.S. Cl. .............................................. 47/59; 47/77; 47/79; 47/84
[58] Field of Search ............ 47/66, 59-65, 47/77-79, 84, 58

[56] References Cited

U.S. PATENT DOCUMENTS

| | | | |
|---|---|---|---|
| 2,189,510 | 2/1940 | Swaney | 47/63 |
| 3,199,250 | 8/1965 | Sawyer | 47/63 |
| 3,744,183 | 7/1973 | Kato | 47/62 |
| 4,034,506 | 7/1977 | Kasahara et al. | 47/64 |
| 4,098,021 | 7/1978 | Gruber | 47/66 |
| 4,106,235 | 8/1978 | Smith | 47/59 |

FOREIGN PATENT DOCUMENTS

| | | | |
|---|---|---|---|
| 2059748 | 6/1972 | Fed. Rep. of Germany | 47/63 |
| 2101161 | 8/1972 | Fed. Rep. of Germany | 4/62 |
| 2744143 | 4/1979 | Fed. Rep. of Germany | 47/78 |
| 1390943 | 10/1965 | France | 47/63 |
| 284290 | 11/1952 | Switzerland . | |

OTHER PUBLICATIONS

So pflegt man Zimmerpflanzen, Mart et al., 1973, Verlag Paul Parey, Berlin & Hamburg, pp. 42–49.
Mein garten im hause, 1976, Hoffman & Campe Verlag, Hamburg, pp. 178-187.
Bonsai, Dietiker, 1980, Hallwag Verlag, Bern & Stuttgart, pp. 6-9, 42-49.

*Primary Examiner*—Robert E. Bagwill
*Attorney, Agent, or Firm*—Ernest F. Marmorek

[57] ABSTRACT

In a method and an apparatus for handling and growing a plant with the aid of a container adapted to be partially filled with water and having an inner wall surface disposed in use substantially parallel to an upright axis, and including a holding device which may be moved along the inner wall surface between a position near the water level to a position thereabove, and which engages the inner wall surface with its outer surface in any of the positions, and is adapted to receive at least the stem of the plant, the steps include holding the plant in the container, and displacing at least a lower porton of the plant in an upright direction in the container in dependence of the growth of the plant.

42 Claims, 10 Drawing Figures

METHOD AND RECEPTACLE FOR GROWING PLANTS

BACKGROUND OF THE INVENTION

It is known to grow plants in ceramic pots or pots of synthetic plastic material, wherein the pots have wall surfaces disposed parallel to one another. The roots of the plants can then extend into the earth in the pot or to another substrate placed in the pot for receiving the roots. There are also known hydro-culture processes in which the roots in general are maintained in substrates free of any nutrients, such as, for example, expanded clay, grain, or granulates from perlite, sand or the like, and wherein the nutrients are supplied in precisely measured form as a result of lack of any buffer effect. A pot containing the substrate with the plant is then set into a container partially filled with water, so that the roots penetrate the bottom of the pot which is provided with openings and project into the water (see for example Swiss Pat. No. 284,290, or U.S. Pat. No. 4,106,235).

From German laid-open patent specification No. 2,059,748, it is also known to cultivate cuttings for reproduction of suitable plants, for example bushes, shrubs, trees or hydro-culture plants, in a container which, for example has parallel inner wall portions. Here the plant is inserted by means of root-receiving means, made, for example of foam, into a container for hydro-culture filled partially with water, so that the roots project from the root-receiving means into the water. After a suitable time the root-receiving means can be transplanted from the container the hydro-culture into the earth.

These processes suffer from the disadvantage however, that the insertion of the container for hydro culture requires a substrate or a container for the substrate, which encloses the roots of the plant. Prior to planting the plant in the earth, the roots must be freed from the substrate, or the roots must be cleared, for example by plucking the substrate apart, which may injure the roots. It is also necessary during the transplant operation to remove the container for the substrate, so that the roots may pass immediately into the earth, which is also a costly operation which generates a lot of dirt.

It is also known to induce cuttings for the reproduction of suitable plants in a container, which is partially filled with water, to generate roots, such that the cuttings standing on the floor or bottom of the container are maintained generally loose with respect to one another, so that following generation of roots, a transplant in a desired substrate may be accomplished.

Finally there are known processes for restricting plant growth, which act particularly on the root system, for example the known Bonsai culture. Here the space for the roots is purposely limited, and the roots as well as the surface portion of the plant are cut, or as in another known process, the space available for the roots is limited to a very fine perforated funnel-shaped metal insert within a normal earth portion. In a Bonsai process for growing woody plants for example, shrubs, trees, bushes and the like, as is known a flat container, a so-called Bonsai container is used, which contains a plant substrate, namely earth, which is intended to limit the space for the roots. In the initial stage even, for example an orange peel can serve as a container, through which the roots can grow. Later the plant can be transplanted into a Bonsai container. In order to limit growth, the roots as well as the surface portion of the plant are cut from time to time, in order to attain an artful dwarf-like or crippled form of growth of the plant ("Mein Garten im Hause" Hoffman and CampeVerlag, Hamburg, Federal Republic of Germany, 1976, Pages 178 to 186, or Roger Grounds "So pflegtman Zimmerpflanzen", Verlag Paul Barey Berlin and Hamburg, Federal Republic of Germany, 1978, Pages 42 to 49; or V. Dietiker, "Bonsai Japanische Zwergbäumeals Hobby", Hallwag-Verlag Bern, Switzerland, 1980.)

So that the roots can be cut, they must however first of all be freed from earth avoiding any damage to the roots, which is costly and generates a lot of dirt. As is known it is also necessary that a sufficient number of fine hair-like roots are disposed densely around the main stem, for if the relatively stronger roots were to be cut, the plant would suffer damage, which could lead to the death of the plant. Furthermore care must be taken in uprooting the plant, to avoid any damage to the roots. Finally there is also known a growth process of plants from limited plant cells, the so-called Meristem culture. This process must be initiated within a closed container, for example a sterile glass container under extremely hygienic conditions. This Meristem culture is accomplished in a special gel suitable for plants, which contains exactly measured traces of the required nutrients and trace elements, as well as growth inhibitors. The miniature plants developed therefrom have been made available in commerce in such reaction containers and using the special gel, in a manner so that the miniature plants "float" on the gel, and abut the wall of the container when growing. This costly method, has not, however been successful, as the growth of the plant can to all intents and purposes not be influenced, and because the very sensitive miniature plants die easily, certainly during any attempt to transplant them, due to the many bacteria and other damage-causing factors contained in the surrounding atmosphere, to which the miniature plants are not accustomed.

SUMMARY OF THE INVENTION

It is an object of the present invention to obviate the disadvantage of the known prior processes, and to devise a process of the aforedescribed kind and a container for carrying out the same, in which the growth of the plant can be controlled as desired, and can, for example, also be limited. This object is attained in a method of handling and growing a plant with the aid of a container partially filled with water and having an inner wall surface disposed in use substantially parallel to an upright axis, and including holding means movable along the inner walls surface, between a position near the water level to a position thereabove, engaging the inner wall surface with its outer surface in any of the positions, and adapted to receive at least the stem of the plant, in which the steps include holding the plant in the container, and displacing of the plant substantially in a vertical direction in the container in dependence of the growth of the plant.

This makes it possible not only to immerse the plant in dependence of its type and growth characteristics more or less deeply with its roots into the water, but also makes possible to position the plant by vertically displacing it in the container to a position suitable for root growth, and to influence its growth correspondingly.

By employing this process the inner atmosphere of a container which for example is also closed on the top is therefore more even during the plant growth, which extends over a relatively long time, and the plants are therefore exposed much less to changing temperatures, drafts and the like. The combination of containers, securing of the plants, and water content can be so optimized, that it is possible to transport the entire system, if necessary in a horizontal position, and even under conditions where the plants are not exposed to adequate light, and where such transport can last several days. In any case the plant system does not have to be tended by an absent user for several weeks, if not months, without suffering any major damage. The plant is therefore accommodated in a limited living space, through which its growth is limited. This can be accomplished by excluding any surrounding air, or by reducing the air supply from the surroundings.

This makes it possible that even persons unfamiliar with growing plants can tend to the plant in a simple manner. If the walls of the container are, for example transparent, then the plant may be exposed for a relatively long period of time to only one light source, and can subsist for a long time even without replenishment of water and nutrients. On the other hand it is also possible to maintain, for example, any desired slow growth of the plant. Observation of this type, particularly during the "youth" of the plant, establishes a positive relationship also for persons not used to growing plants. Finally by this unhindered observation an optimization of the quantity of water, air space within the region of the roots, quantity of nutrients and air space for the foliage, namely the surface portion of the plant, is also possible for a person not experienced in growing plants. It is also possible, for example, by partial or entire occlusion of light or filtering of light, such as permitting light of only a certain wavelength to pass to the plant, to qualitatively and quantitatively influence the growth of the plant, and to determine the blossoming of the plant and the timing thereof.

To carry out the method there is advantageously provided a container adapted to be at least partially filled with water, and having an inner wall surface disposed substantially parallel to an upright axis, holding means movable along the inner wall surface between a position near the water level and a position thereabove, engaging the inner wall surface with its outer surface in any of the positions, and adapted to receive at least the stem of the plant, said holding means being adapted to move with the plant at least in an upward direction. In a preferred embodiment the holding means displaceable along the inner wall surface may be movable upwardly and downwardly, so that the plant may be positioned by means of the holding means in an appropriate position according to its growth. Not only is it possible to immerse the roots by the displaceable holding means more or less deeply into the water, but the plant may be also moved according to its growth in the container upwardly, and, for example, the surface portion of the plant can upon appropriate development be allowed to extend outwardly from the container and be in contact with the surrounding air.

The growth of the plant may be subdivided into two different phases, and wherein the first phase making use of the holding means entirely within the container system differs substantially from other known house plant arrangement, as will be described herein below.

It has been shown that plants grown as described can continue to grow beautifully in both regions. But it has also been shown that for example in the case of a transparent container, and where light is not permitted to reach the roots, a control of the water-to-air-ratio in the root space can be optimally achieved, so that the growth and state of the plant grown from small beginnings can be observed; this may be achieved without, for example, any unnaturally acting water-level indicating means. It should be further noted that the measure of not permitting any light to reach the roots may also serve to prevent growth of any algae.

It has further been shown that the method and the receptacle according to the invention may be advantageously used for growing a plant according to the Bonsai process, if the growth of the plant is retarded, for example in a root space which is small compared to the space allotted to the surface or head portion of the plant. By the method according to the invention, which follows a type of hydro-culture, the root space can advantageously be offered in a reduced form for the Bonsai culture, namely in the form which makes the root space relatively small.

It is to be noted that the root space in particular can be kept small in comparison to normal earth cultures. The water, for example, is a better transport vehicle for nutrients than earth, which, as is known, can only supply nutrients in certain quantities to the plant, and, for example, also requires additional moisture. In an advantageous manner by this method, according to the present invention, drying out of the plant can also be avoided, such as can happen during earth cultures. The plant may be also positioned in the container, so as to reduce growth of the roots, or to maintain its roots small, by vertical displacement within the container. By allotting a small root space to the plant one ensures, for example, that the roots cannot extend beyond a desired measure. Here, for example, the space for the roots is smaller than in conventional known earth cultures, so that the growth of the roots can be advantageously matched to the Bonsai culture. In order to retard the growth of the plant, the plant can, at a suitable time, together with the holding means, be removed from the container, the roots can be cut, and subsequently the holding means together with the plant can be reinserted into the container. The method, according to the invention, can therefore meet the demands which, for example, are required for growing a plant according to the Bonsai process. The roots of the plant are freely accessible, as the roots are free of any substrate, for example, earth and are simply immersed in water. Thus the roots are freely accessible from all sides. It is not necessary to remove any substrate from the roots, such as, for example earth, by, for example, tapping off any earth, and therefore the roots may be cut in a simple manner without generating any dirt. Thus in order to cut the roots, the plant may be simply removed from the container together with the holding means, and subsequently reinserted into the container.

In the method, according to the present invention, a plant can therefore be grown according to the Bonsai culture, and combined with the advantages of the hydro-cultures, so that it is advantageously possible to refer to a Hydro-Bonsai culture. Thus it is possible that even persons totally unfamiliar with the growth of plants can carry out the Bonsai process in a simple manner and inexpensively.

In particular, for example, in dependence of the plant type to be grown, the plant together with the holding means can be inserted with its roots to such a depth into the container, so that it is possible to achieve a small root space in relation to the space allotted for the surface portion of the plant. Following cutting the plant with its shortened roots can be immersed to a correspondingly greater depth into the container.

The method, according to the present invention, and the container therefor also permit a simple and advantageous cutting of the surface portion of the plant, for example woodgrowing plants, such as trees, bushes, shrubs or the like, as is usual, for example in a Bonsai-process. Here too the plant, for example, may only be removed by way of its holding means from the container, if the surface portion of the plant, particularly, for example, in its early growth stage, should still be disposed within the container. Thus the measures necessary for the Bonsai culture in the early stages of growth of a plant can be accomplished without risking any damage to the plant, particularly damage to the roots, in contrast to those measures necessary when carrying out the Bonsai culture where such measures can only be carried out at relatively high expense and generating dirt.

Other objects of the invention will in part be obvious, and will in part appear hereinafter.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENTS

Figure 1:
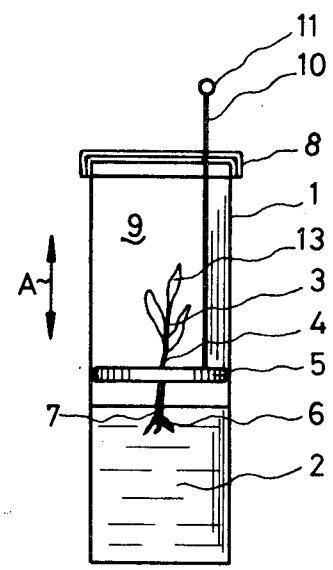
FIG. 1 is a schematic view of a container containing a plant in an early or first growth stage.
Figure 2:
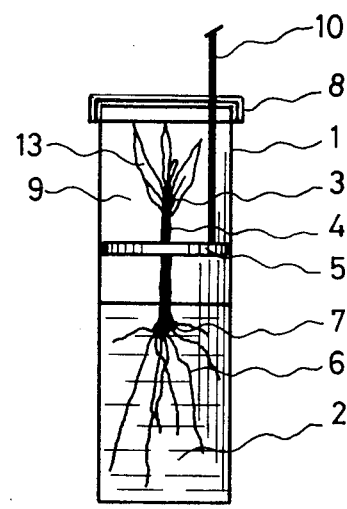
FIG. 2 is a view of the container of FIG. 1 containing the plant in a further growth stage.
Figure 3:
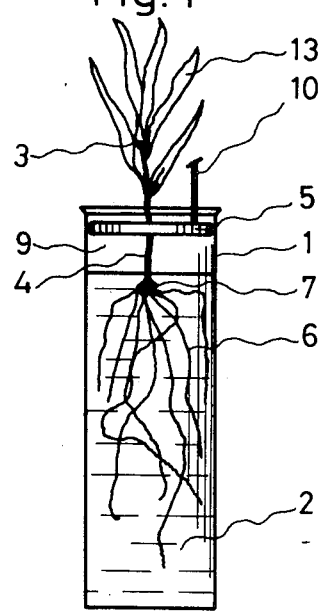
FIG. 3 is a view of the container of FIG. 1 in a last growth stage.

In carrying the invention into effect, and referring now particularly to FIGS. 1 through 3, a transparent container 1, made, for example, of glass or transparent synthetic material, is partially filled with water 2, and contains a young plant or seedling 3, which is held in holding means 5, for example, a circular disc, horizontally and vertically by, for example, its stem passing through a (non-illustrated) opening in the disc 5. The lower portion of the plant 7 containing its roots 6 is immersed in the water 2. The holding means 5 may be made of a resilient, or elastic material, for example, synthetic material, foam, fibrous material or the like; but it can also be made of a stiff material and formed with an opening having a diameter so as to hold the stem 4 of the plant, without there occurring any damage to the growing plant. The holding means 5 is frictionally arrestable in an arbitrary position on the inner wall surface of the container 1, which is the example shown, has a circular cross-section; thus the holding means 5, for example a disc, may be moved vertically up and down in the direction of the double arrow A along the inner wall surface of the container 1. The container 1 is closed on its upper open end by a cap 8, so that substantially no air exchange takes place between an air space 9 in the container 1 and the air surrounding the container 1. A guiding wire 10 is affixed to the holding means 5, which extends through a (non-illustrated) opening in the closure cap 8 upwardly and outwardly, the wire 10 being slidable in the opening. The wire 10 can be gripped by means of a handle 11 affixed thereto. The wire 10 may also consist of a thin rod of an arbitrary material, for example, synthetic material or metal. But, it is also possible to use pairs of wires or the like.

In FIG. 1 the young plant or seedling 3 is shown in a first growth stage, there being provided only a limited space for the plant in the container 1. Photosynthesis is particularly retarded, as within the limited air space 9 only carbon dioxide is available and as a surplus amount of oxygen is given off by the plant, which is growth-limiting. However, a favorable moist atmosphere is available for the development of the roots. Development of the plant therefore occurs exclusively in the limited space and by the light entering the container 1.

In FIG. 2, in which the same parts bear the same reference numerals as those of FIG. 1, there is shown the young plant or seedling 3 in a further growth stage, in which the holding means 5 is displaced with respect to its position in FIG. 1 upwardly, so that the plant itself is also displaced upwardly with respect to the position shown in FIG. 1, its leaves 13 already abutting the lower side 14 of the cap 8. At this time period the first growth stage of the plant can be considered concluded, and for a further development of growth of the young plant 3 in a second growth stage, the cap 8 is removed, so that the young plant 3 is now exposed to the surrounding atmosphere in the room or outside, as is shown in FIG. 3, where parts identical with FIG. 1, also bear the same reference numerals. The young plant 3 can therefore develop in a direction beyond the container 1 upwardly, wherein the holding means 5, such as a disc, is pulled upwardly together with the plant 3 into the upper portion of the container. Here the plant can develop under accelerated growth conditions, particularly since the pulling up of the holding means 5 has considerably increased the space for the roots of the plant, for example, has almost doubled it.

It is possible to either use natural water alone, or it is also possible to add means to the water which favorably influence the growth of the plant. The water may, for example, be filled with nutrients only to an extent suitable for growth of the plant.

In the initial growth phases (FIGS. 1 through 3) the container 1 may be placed on any arbitrary spot or suspended from any suitable spot, and thus is pleasant to look at in each phase of the development of the young plant 3, particularly during its first growth stage. Until it is transplanted, for example into earth, the young plant or seedling 3 can remain in the opened container 1 according to FIG. 3. This, however, should be done only as long as the roots are not restrained from growing by the limited water-containing portion of the container 1.

Figure 4:
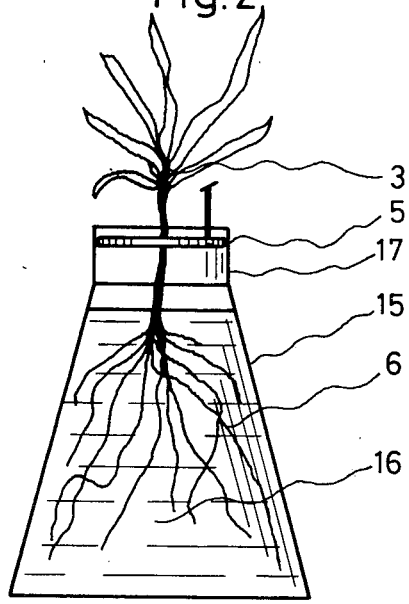
FIG. 4 is a schematic view of another receptacle following transplant of the plant from the first container.

If, for example, the plant has grown to such an extent that the roots have largely filled the inner region of the container, the plant can be transplanted without any difficulties into another receptacle having a larger space for the roots, and whose upper receptacle portions for example, are matched to the holding means; alternatively the holding means 5 may be matched to the new receptacle by another insert which surrounds the holding means 5. The plant is therefore transplanted into a receptacle 15 having a larger inner volume than the container 1, and which is also partially filled with water 16, as shown in FIG. 4, in which identical portions bear the same reference numerals as those in FIG. 1. The plant can remain in the receptacle 15 for a long time or forever, or it can of course be transplanted into earth. As the upper portion 17 of the receptacle 15 has the same inner diameter as the container 1, it also can receive the holding means or disc 5. The transplant of the baby plant 3 into the receptacle 15 can also be accomplished at the time period of the initial growth stage, according to FIG. 1. In this manner, it is possible to advance the development of the baby plant at an arbitrary point in time or to further limit its growth.

The growth of the plant may be retarded, for example, by reducing the air supply to the plant, or periodically excluding air from the atmosphere surrounding the container 1 from entering it, or impairing the air within the container, for example by increasing the humidity of the air in the container 1 beyond a value compatible with normal plant growth.

Figure 5:
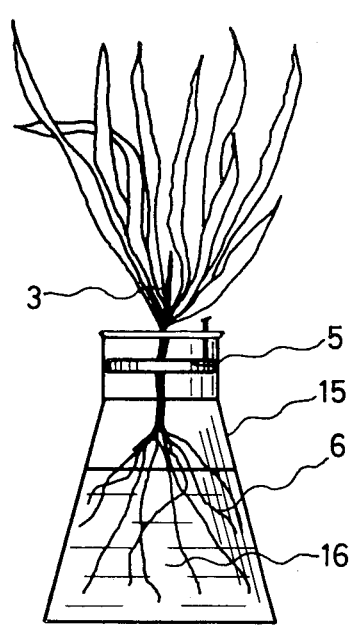
FIG. 5 is a view of the receptacle of FIG. 4 following full growth of the plant.
Figure 6:
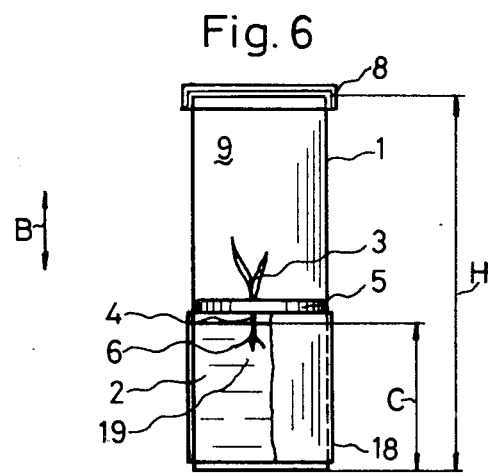
FIG. 6 is an alternate schematic view of the container of FIG. 1.

The cap 8 can also be opened at an arbitrary period in time during the first growth stage either for a short time, or for a long time, so as to permit free passage of air into the air space 9, so that the growth of the baby plant 3 is accelerated during short periods or long periods. In FIG. 5 the plant 3 is shown fully developed, but there the roots are partially disposed in the air space, as a result of the position of the holding means 5. FIG. 6 shows the container 1 of FIG. 1 in an alternate embodiment, where it is surrounded exteriorly by a cover 18 (shown partially broken away), which extends along the entire periphery of the container 1, and along a portion of its height H, at least up to the water level C. The cover 18 may also consist of paper, metal foil, synthetic foil or the like, and is preferably impervious to light, or at most permits light to only partially pass therethrough. By this measure a root-containing space 19 partially filled with water 2 can be darkened, so that the growth of the young plant can be further restricted. A cover of this type can be realized by means of a sleeve, which may be passed over the container 18 and displaced therealong along the double arrow B. By this means it is possible not only to darken the root space 19 in an arbitrary manner, but also to darken the air space 9 within the container 1.

Figure 7:
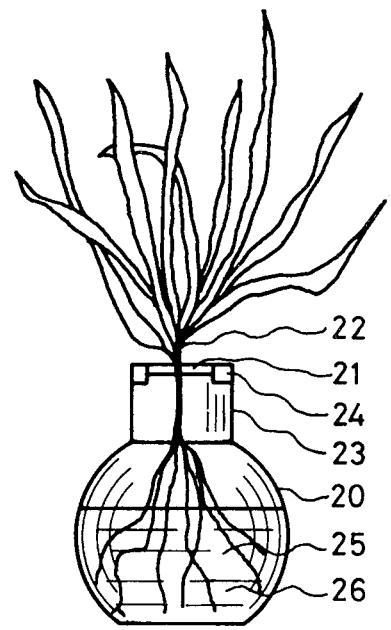
FIG. 7 is an alternate receptacle for receiving a plant transplanted from a container which has accommodated the plant during its growth phase.

FIG. 7 is a further transparent container 20 including a holding means 21 for the young plant 22, which holding means 21 is vertically displaceable in the neck 23 of the container 20. The holding means 21 has a diameter smaller than the inner diameter of the neck 23, and is therefore received by an insert 24, which is vertically displaceable in the neck 23. The container 20 has a diameter below that of the neck 23 which is larger than the inner diameter of the neck 23, so that an adequately large root space 25 is available for the full growth of the young plant 22 immersed in the water 26 disposed in the container 20. If the container 20 is suitably closed on the top, it can also be used for pulling up the plant in its first growth stage. But, it is also possible to transplant the young plant 22 from another container by inserting the holding means 21 into the insert 24.

The cap 8 can be made of any arbitrary material, for example synthetic material, rubber or the like. Instead of a young plant, it is also possible to use a seedling, which quickly takes roots in the system.

It will be understood that, for example, during the phase of the system which is substantially closed, it is also closed from the influence of any vermin or parasites, so that, for example, vermin, insects or parasites cannot adversely influence the growth of the plant, and there is no need for injecting any insect-killing poison into the system. Any possible growth of algae can be stopped by suitable means, and the growth of the roots can be influenced, for example, by suitable root growth hormones.

Figure 8:
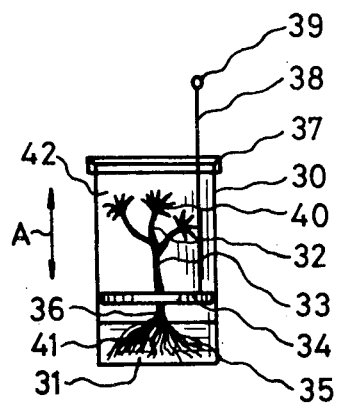
FIG. 8 is a container for growing a plant according to the Bonsai culture, in schematic view.

In FIG. 8 there is shown a transparent container 34, a bonsai culture, which is made, for example, of glass or transparent synthetic plastic, partially filled with water 31 and which contains a young plant 32 of a pine tree, which is again supported elastically through its stem 33, which passes via a (non-illustrated) opening in the holding means 34, for example, a disc, which disc 34 completely surrounds the stem 33. The roots 35 of the lower end 36 are immersed in the water 31. The holding means 34 can be implemented in the example shown as in FIG. 1, and may also be disposed within the circular cross-section of the upper portion of the container 30, and be vertically movable therein along the dual directions of the double arrow A, but also arrestable therein. The container 30 is closed on its upper open end by a cap 37, and the holding means 34 is provided with a guide wire 38 having a handle 39, which parts fulfill the same functions as similar parts described with the aid of FIG. 1. The roots 35 are disposed in a root-containing space 41, which is limited to restrain growth of the roots, and which root-containing space 41 is smaller than the space 42 containing the surface portion of the young plant 32. The root-containing space 42 can, for example, be at least a third of that of the space 42 receiving the surface portion of the plant. In order to cut the roots 35, the holding means 34 is pulled out together with the young plant 32, by means of the guide wire 38 from the container 30, so that the bare roots of the plant 32 are available to be cut. Outside of the container 30 there are disposed not only the roots 35, but also the surface portion 40 of the young plant, so as to form it in accordance with the Bonsai culture. Following cutting, the holding means 30 together with the young plant 32 and the cut roots are again inserted into the container 30. By this means the roots 35 are inserted into the water 31, thus dispensing with a costly transplant into earth, as is required in other conventional Bonsai cultures. Thus the root 35 can be cut back without any additional expense or generation of dirt, so that this work can, for example, also be accomplished in a room.

Figure 9:
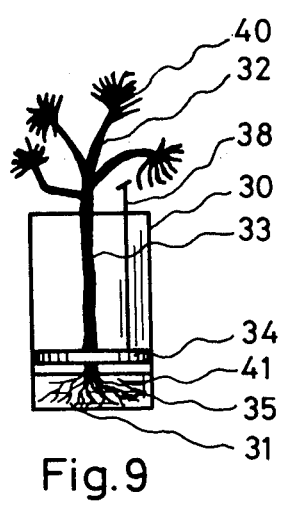
FIG. 9 is a view of the container of FIG. 8 in a further growth stage of the plant.

Following the first growth stage, the cap 37 is taken off from the container, so as to permit a further development of the young plant 32, particularly to expose the young plant 32 to the surrounding air, as is shown in FIG. 9, in which similar parts have been designated with the same reference numerals as those in FIG. 8. The young plant 32 can therefore develop within the container 1 in an upward direction. The processes in the first and second growth stages develop in a similar method as has been already described by means of examples with respect to FIGS. 1 and 3.

Figure 10:
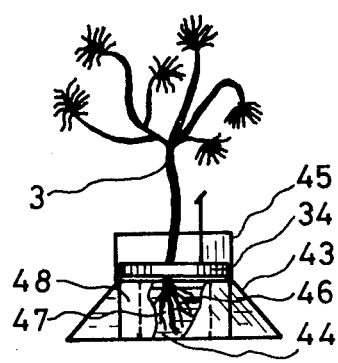
FIG. 10 is an alternate receptacle for the Bonsai-culture grown in a container of the general type of FIG. 1.

Until it is transplanted into a conventional Bonsai receptacle, the young plant 32 can remain in the open container 30 as shown in FIG. 9. It is alternately possible also to transplant it into receptacle 43 having a different volume, or to use the same receptacle, which is partially filled with water 44, as shown in FIG. 10, in which identical parts have been allotted the same reference numerals as those in FIGS. 8 and 9. As the receptacle 43 has in its upper portion 45 the same inner diameter as the container 30, it also receives the holding means 34. The young plant 32 again possesses within the receptacle 43 relatively longer roots 46, which may be cut back, as has already been described, by simply removing the holding means from the receptacle 43. It is also possible to insert a, for example, annular insert 48 into the receptacle 43, which limits the space 47 allotted for the roots, which insert 48 may be made of rock wool, wood, synthetic material or the like. In lieu of the insert 48 it is also possible to use glass, perlite stones or the like. The water may also be available within the receiver in a thickened state, for example as a form of gel suitable for transport, which can also contain nutrients, if required, which are then transported through the gel more slowly to the roots. Granular or fibrous masses can also be added to the water, which is favorable for transporting the container and favors retention of the roots. Glassy spheres or sand can be used for the granular masses, care must be taken however, that the roots remain visible.

The holding means can be arrested, in view of the friction prevailing between a surface thereof and the inner surface of the container, by elastically pressing the same to an arbitrary portion of the inner wall surface. Furthermore, for example, only the upper portion of the holding means need be constructed so as to permit light to pass therethrough. The previously described cover, according to FIG. 6, can also be implemented, in the form of a displaceable sleeve for the upper portion of the container. The holding means can also consist of a foam receiving the stem of the plant, for example of a foam having closed pores. In lieu of a guide wire, (FIG. 1) which is preferably made of a rust-free material, it is also possible to use a wire of synthetic materials. The upper cover of the container, for example the cap 8 of FIG. 1, may have an opening, through which water may be poured into the container. The container may further have a flat underside so as to place it on a suitable location, or may be arranged to be hung from a suitable support. The container may further be shielded, for example by means of a sleeve, both from daylight as well as from artificial light within the region of the root space. At least in the upper portion of the container it can be suitably covered, so that light of only a particular wavelength may enter the walls of the container.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. In a method of handling and growing a plant with the aid of a container adapted to be partially filled with water and having an inner wall surface disposed in use substantially parallel to an upright axis, and including holding means movable along said inner wall surface between a position near the water level and a position thereabove, engaging the inner wall surface with its outer surface in any of said positions, and adapted to receive at least the stem of the plant, the steps comprising:
holding said plant in said container, and
displacing of said plant in an upright direction in said container in dependence of the growth of said plant.

2. In a method as claimed in claim 1, further comprising the step of retarding the growth of said plant.

3. In a method as claimed in claim 2, wherein said plant is normally supplied with air, and wherein the growth-retarding steps include the step of reducing the air supply to said plant.

4. In a method as claimed in claim 3, wherein the air-supply reducing step includes the step of periodically excluding air from the atmosphere surrounding said container from entering said container.

5. In a method as claimed in claim 3, wherein the air-supply reducing step includes the step of limiting air exchange between the atmosphere surrounding said container and the air in said container.

6. In a method as claimed in claim 3, wherein said container normally includes air, and wherein the growth-retarding steps include the step of impairing the air within said container.

7. In a method as claimed in claim 6, wherein the air-impairing step includes the step of increasing the humidity of the air in the container beyond a value compatible with normal plant growth.

8. In a method as claimed in claim 2, wherein light is normally supplied to said plant, and further comprising the step of controlling the growth of said plant by modifying light supplied to said plant.

9. In a method as claimed in claim 8, wherein the light-modifying step includes the step of illuminating the roots of said plant.

10. In a method as claimed in claim 8, wherein the light-modifying step includes the step of excluding light from reaching the roots of said plant.

11. In a method as claimed in claim 1 with the aid of a receptacle, of which a portion is adapted to contain the roots of said plant, and further comprising the step of transferring said plant from said container to said receptacle, so that the roots of said plant are confined to said root-containing portion.

12. In a method as claimed in claim 1, further comprising the step of adding ingredients to the water to influence the growth of said plant.

13. In a method as claimed in claim 1, further comprising the step of adding plant nutrients to the water.

14. In a method as claimed in claim 1, further comprising the step of controlling the growth of said plant in dependence of the proportion of water and air allotted to the roots of said plant within said container.

15. In a method as claimed in claim 1, further comprising the steps of allotting a first space to the head portion of the plant, and allotting a second space to the roots of said plant, and wherein said first space is larger than said second space, so as to retard the growth of said plant.

16. In a method as claimed in claim 15, further comprising the step of moving said plant downwardly by said holding means, thereby further increasing said first space with respect to said second space, so as to further retard the growth of said plant.

17. An apparatus of handling and growing a plant, comprising in combination:

a container adapted to be at least partially filled with water and having an inner wall surface disposed substantially parallel to an upright axis, holding means movable along said inner wall surface between a position near the water level to a position thereabove, engaging the inner wall surface with its outer surface in any of said positions, and adapted to receive at least the stem of a plant, said holding means being adapted to move with said plant at least in an upward direction.

18. An apparatus as claimed in claim 17, wherein said holding means is a disc slidable along said inner wall surfaces.

19. An apparatus as claimed in claim 17, wherein said container has a substantially circular cross-section.

20. An apparatus as claimed in claim 17, wherein said container has a substantially square cross-section.

21. An apparatus as claimed in claim 17, wherein said container has a triangular cross-section.

22. An apparatus as claimed in claim 17, wherein said container has a substantially rectangular cross-section.

23. An apparatus as claimed in claim 17, wherein said container has an oval cross-section.

24. An apparatus as claimed in claim 17, wherein said holding means is frictionally arrestable in an arbitrary position on said inner wall surface.

25. An apparatus as claimed in claim 17, wherein at least an upper portion of said container, as defined in a direction away from the water level, is transparent.

26. An apparatus as claimed in claim 25, wherein said upper portion includes glass.

27. An apparatus as claimed in claim 25, wherein said upper portion includes synthetic material.

28. An apparatus as claimed in claim 17, wherein said container includes a light-impervious sleeve adapted to surround the roots of said plant.

29. An apparatus as claimed in claim 28, wherein said light-impervious sleeve is movable along said container.

30. An apparatus as claimed in claim 25, wherein said upper portion permits the entry of light of a predetermined wavelength so as to influence the growth of said plant.

31. An apparatus as claimed in claim 17, further comprising a fibrous layer for embedding plant nutrients.

32. An apparatus as claimed in claim 17, wherein said holding means includes an elastic foam.

33. An apparatus as claimed in claim 32, wherein said elastic foam has at least partially closed pores.

34. An apparatus as claimed in claim 17, further comprising guide means for displacing said holding means.

35. An apparatus as claimed in claim 34, wherein said guide means comprise a rust-resistant wire.

36. An apparatus as claimed in claim 35, wherein said rust-resistant wire comprises synthetic plastic material.

37. An apparatus as claimed in claim 17, wherein said container has an upper portion as defined in a direction away from the water level, and further comprising closure means at least partially restraining air exchange between said container and the atmosphere.

38. An apparatus as claimed in claim 37, wherein said closure means has at least one aperture for fluid passage.

39. An apparatus as claimed in claim 17, wherein said container has a first portion adapted to contain the roots of said plant, and a second portion at least three times larger than said first portion, adapted to contain at least a head portion of said plant.

40. An apparatus as claimed in claim 17, further comprising means for moving said holding means with said plant at least in an upward direction.

41. An apparatus for handling and growing a plant, comprising in combination:

a container partially filled with water and having an inner wall surface disposed substantially parallel to an upright axis, holding means movable along said inner wall surface between a position near the water level and a position thereabove, engaging the inner wall surface with its outer surface in any of said positions, and receiving the stem of a plant.

42. In a method of handling and growing a plant with the aid of a container partially filled with water and having an inner wall surface disposed in use substantially parallel to an upright axis, and including holding means movable along said inner wall surface between a position near the water level and a position thereabove, engaging the inner wall surface with its outer surface in any of said positions, and receiving the stem of the plant, the steps comprising:

holding said plant in said container, and displacing of said plant in an upright direction in said container by means of said holding means in dependence of the growth of said plant.

* * * * *